United States Patent [19]

Penzias et al.

[11] Patent Number: 5,515,425
[45] Date of Patent: May 7, 1996

[54] TELECOMMUNICATIONS SYSTEM WITH ACTIVE DATABASE

[75] Inventors: Arno A. Penzias, Highland Park; David G. Belanger, Belle Mead; Joel K. Young, Middletown, all of N.J.

[73] Assignee: AT&T Corp., Murray Hill, N.J.

[21] Appl. No.: 6,333

[22] Filed: Jan. 19, 1993

[51] Int. Cl.$^6$ ................................................ H04M 15/00
[52] U.S. Cl. ..................... 379/114; 379/111; 379/112; 379/113; 379/115; 379/121; 379/125; 379/128
[58] Field of Search ....................... 379/112, 111, 379/113, 114, 115, 121, 125, 128, 220, 221, 143, 144, 155, 207, 230

[56] References Cited

U.S. PATENT DOCUMENTS

| | | | |
|---|---|---|---|
| 4,122,308 | 10/1978 | Weinberger et al. | 379/114 |
| 4,410,765 | 10/1983 | Hestad et al. | 379/112 |
| 4,585,904 | 4/1986 | Mincone et al. | 379/112 |
| 4,751,728 | 6/1988 | Treat | 379/113 |
| 4,791,665 | 12/1988 | Bogart et al. | 379/221 |
| 4,924,510 | 5/1990 | Le | 379/221 |
| 5,003584 | 3/1991 | Benyacar | 379/121 |
| 5,067,127 | 11/1991 | Ochiai | 370/58.1 |
| 5,086,456 | 2/1992 | Shizawa et al. | 379/221 |
| 5,086,461 | 2/1992 | Thorn | 379/230 |
| 5,134,647 | 7/1992 | Pugh | 379/230 |
| 5,150,405 | 9/1992 | Lee | 379/230 |
| 5,182,750 | 1/1993 | Bales et al. | 379/221 |
| 5,201,045 | 4/1993 | Pflueger | 379/207 |
| 5,212,691 | 5/1993 | Hokari | 379/220 |
| 5,241,588 | 8/1993 | Babson | 379/230 |
| 5,268,895 | 12/1993 | Topper | 379/230 |
| 5,282,244 | 1/1994 | Fuller | 379/207 |
| 5,311,572 | 5/1994 | Friedes | 379/207 |
| 5,311,582 | 5/1994 | Davenport | 379/143 |
| 5,319,701 | 6/1994 | Hird | 379/144 |

FOREIGN PATENT DOCUMENTS 0258654  3/1988  European Pat. Off. .

OTHER PUBLICATIONS

Seveque, F., et al., "ABC—A State-of-the-Art Private Networking Solution," *L'Onde Electrique,* Sep.–Oct., 1991, vol. 71, No. 5, pp. 49–53.

*Primary Examiner*—Stephen Chin
*Assistant Examiner*—Vijay Shankar
*Attorney, Agent, or Firm*—Ronald P. Slusky; Donald P. Dinella

[57] ABSTRACT

Interexchange carriers make their rate information for long-distance service available in a database. PBXs and telephone central offices access that rate information using ISDN and/or SS7 signaling and use it as a basis for determining which carder to use at any given time in the routing of a call. Such accessing may be carried out on a call-by-call basis. Or a carrier's schedule of rates can be stored locally in the PBX or local switching office, thereby obviating the need for a database query for every call.

10 Claims, 5 Drawing Sheets

5,515,425

TELECOMMUNICATIONS SYSTEM WITH ACTIVE DATABASE

BACKGROUND OF THE INVENTION

The present invention relates to telecommunications.

Increasing competition in the provision of telecommunications services is a world-wide trend. It is perhaps the most advanced, however, in the United States, where competition has evolved to the point that virtually all telecommunications services can be obtained from a range of telecommunications service providers. This includes both services provided to consumers, such as basic long-distance service, and business-oriented services, such as sophisticated outbound calling programs. Moreover, the existence of competition among the various service providers has had the effect of subjecting the rates charged for telecommunications services to the forces of the marketplace, rather than being set by regulatory mandate.

SUMMARY OF THE INVENTION

It has now been realized that technologies that are currently available today can be harnessed to further extend the concept of free-market pricing for telecommunications services—particularly the per-call rates charged for telephone calls. In accordance with the invention, a telecommunications service provider, such as an interexchange carrier, makes its rate information for at least one service—such as basic long-distance service—available in a database. That information is updated on an ongoing basis in response to such "rate-controlling" data as the current levels of traffic within the various portions of the service provider's network; observed trends in those levels over time; or rates currently offered by other service providers. Given the availability of such a database in accordance with the invention, switching equipment which originates subscribers' calls—such as a PBX or central office—can obtain the rate information stored therein and use it as a basis for determining which provider to use at any given time. The invention is advantageous for the service providers in that they can, for example, match their rate schedules to take advantage of unique calling patterns that may develop in the course of a day; or stimulate or discourage traffic in particular parts of their networks to match demand with capacities. They can also use it to take into account rate changes initiated by other service providers. The invention is advantageous for subscribers because it allows them to "shop" for the lowest possible rates.

The accessing of the database could be carded out on a call-by-call basis. Or a service provider's schedule of rates applicable to calls originating from a PBX, central office or other originating location can be stored locally thereat, thereby obviating the need for a database query for every call. The originating location equipment could periodically query the service providers' database to obtain the latest rate schedule. Or the service providers could deliver same on a periodic basis, or whenever a change in the rate schedule is effected.

In accordance with a feature of the invention, the database may advantageously be a known type of database referred to as an "active" database whose database manager both a) stores the rate-controlling data and b) automatically initiates an updating of the rate schedule based on that data in accordance with predetermined criteria programmed into the database itself using so-called "alerters" or "triggers."

There are known arrangements in which a PBX, for example, chooses which of two or more service providers a call should be routed to based on stored tables of the toll rates offered by those providers. It is also known in the prior art for LECs to offer a service wherein a dialed call is automatically routed to the lowest-cost provider. It is not known in the prior art, however, for a telecommunications service provider to update its rates in response to rate-controlling data and to make those rates available to a PBX, central office, or other call-originating equipment on an ongoing basis.

BRIEF DESCRIPTION OF THE DRAWING

The invention may be more fully understood from a consideration of the following detailed description of various illustrative embodiments shown in the drawing. The FIGS. of the drawing, more particularly, are as follows.

DETAILED DESCRIPTION

Figure 1:
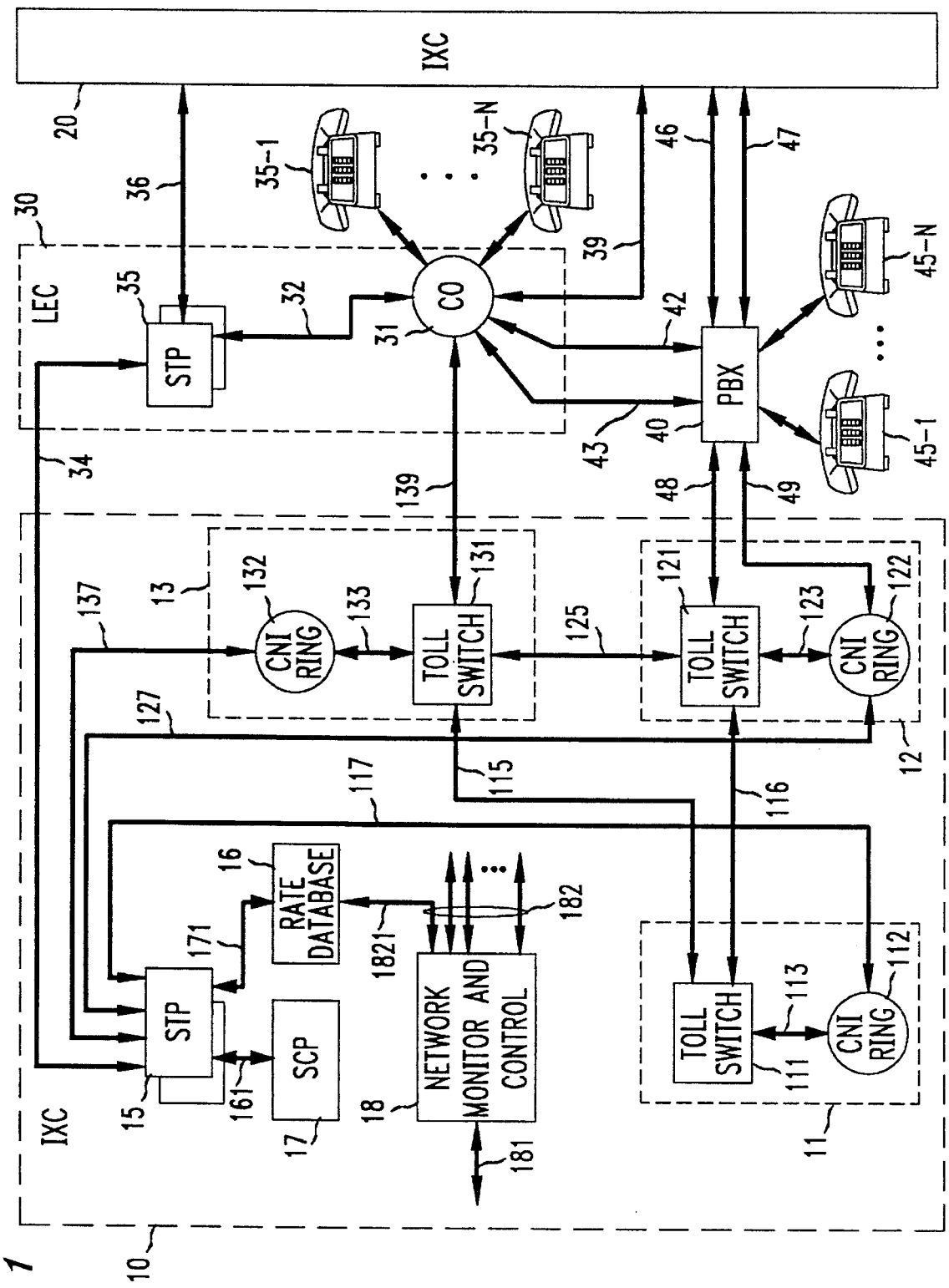
FIG. 1 depicts an illustrative telecommunications network in which the invention is implemented.

FIG. 1 shows a telecommunications network in which the invention is implemented. The network illustratively includes three interconnected telecommunications service providers' networks: local exchange carder (LEC) network 30 and interexchange carder (IXC) networks 10 and 20. These three networks all provide services to subscribers associated with station sets 35-1 through 35-N connected to central office 31 within LEC network 30.

IXC networks 10 and 20 have the same basic structure. Accordingly, only one—IXC network 10—is shown in detail. In particular, network 10 includes a plurality of toll switch complexes, three of which are shown in the FIG.— namely complexes 11, 12 and 13, which are interconnected via interoffice trunks 115, 116 and 125. A toll switch complex typically serves a number of LEC central offices, and in this case it is toll switch complex 13 that serves central office 31 via voice path 139.

SS7 signaling between central office 31 and IXC network 10 is carried out by way of link 32 and signal transfer point (STP) 35 connecting to STP 15 within network 10 via link 34. In general, network 10 will have a number of STPs and STP 35 could, alternatively, be connected to an STP other than STP 15. Each of the STPs is, in actuality, a pair of STP units. This provides each STP installation with load-sharing and backup capabilities. Thus the links shown in FIG. 1 as being connected to an STP are, in actuality, divided between the two STP units of an STP pair. Network 10 further includes a signaling control point, or SCP, 17. This is, in essence, a database, to which queries are directed from within network 10 to obtain, for example, routing information for "800" and "900" type calls and authorization codes for virtual private network (VPN)-type calling.

Also shown in FIG. 1 is a PBX 40 located on a subscriber's premises serving station sets such as station sets 45-1 through 45-M. PBX 40 is interconnected with central office 31 and network 10 via respective ISDN PRI, signaling links. In particular, B channels 43 and D channels 42 extend to central office 31, while B channels 48 and D channels 49 extend to switch complex 12.

Each of the toll switch complexes comprises a "host" toll switch and an SS7 signaling interface. Toll switch complex 11, in particular, includes toll switch 111 serving as host. The SS7 signaling interface is common network interface (CNI) ring 112 described, for example, in U.S. Pat. No. 4,752,924 issued Jun. 21, 1988 to J. W. Darnell et al. Toll switch 111 connects to CNI ring 112 via path 113. Although not explicitly shown in the FIG., path 113 illustratively includes an intermediary processor which controls the passage of information between the switch and the CNI ring.

Toll switch complexes 12 and 13 are configured similarly. In particular, complex 12 (13) includes toll switch 121 (131) serving as host for CNI ring 122 (132). Toll switch 121 (131) is substantially identical to toll switch 111 and connects to CNI ting 122 (132) via path 123 (133).

SS7 signaling among various ones of the network elements just described is provided over a number of SS7 links. In particular, CNI ring 112 has an SS7 connection to STP 15 via link 117. Similar SS7 connections are provided for CNI rings 122 and 132 via links 127 and 137, respectively. Finally, a CNI ring (not shown) within SCP 17 is connected to STP 15 via link 171.

Also included within IXC network 10 is network monitor and control system 18, which is discussed at a more opportune point hereinbelow.

Central office 31 interconnects with IXC network 20 via voice path 39. It also has an SS7 connection to network 20 via SS7 link 32, STP 35 and SS7 link 36. Additionally, PBX 40 is connected to IXC network 20 via ISDN PRI B channels 46 and PRI D channels 47.

In the operation of the network of FIG. 1, a major function of the signaling carried out over the SS7 links is to allow two network elements to be correctly connected. In this process, the SS7 signaling may relate to such functionalities as circuit set-up/tear-down and database (e.g., SCP) lookup in order to implement, for example, number translation for "800" service. The SS7 signaling capability is also used to another purpose. Specifically, and in accordance with the invention, at least one of the IXC networks makes its rate information for at least one service—such as basic long-distance service—available in a database. In this embodiment, more specifically, IXC network 10 maintains the rate database 16 in which its rates for long-distance service are maintained. Illustratively, IXC network 20 maintains a similar database, although, as will be discussed in further detail below, this is not required.

Illustratively, both PBX 40 and central office 31 access the rate information in rate database 16 and in the rate database maintained by IXC network 20. That rate information is then used as a basis for determining, at any particular time, which of the two IXCs a particular call is to be routed to. That determination, in this example, is based simply on which one of the two IXCs is offering the lower rate at the time, although it could take into account other factors such as the existence of discount plans offered by the various service providers.

In the case of the PBX, the choice of IXC is made within the PBX and the call is routed to the selected IXC via the PBX's direct connection thereto. In the case of central office 31, it is assumed that the local exchange carrier which operates that central office offers a "lowest-cost call," or LCC, service to its subscribers wherein the subscriber's local switching office determines the lowest-cost interexchange carder for a dialed call and automatically routes the call to that carrier.

It may not be determinable ab initio which IXC is the lowest-cost provider. For example, one carrier may have the lower initial-period charge while the other has the lower per-minute-thereafter charge. In such situations, some predetermined methodology can be used to make a decision as to which carrier to use. For example, the decision could simply be based on the average length of all interexchange calls; or on a generalized model of call durations between the geographical locations in question; or on statistical information about call durations from the particular station set in question, either generally or to the specific dialed location. The existence of special billing plans offered by service providers for which particular subscribers may be signed up could also be taken into account in making a carrier choice. If the rates offered by the two carriers are the same, or if a lowest-cost provider for a call is otherwise not able to be identified, the call can simply be routed to a pre-identified default provider, currently referred to in the United States telecommunications industry as the "primary interexchange carrier," or PIC.

Rate database 16 is accessed via STP 15 and SS7 link 161 using standard network database access mechanisms. In particular, central office 31 can access rate database 16 using nothing more than a standard SS7 TCAP messaging to extract the desired information. PBX 40 could similarly query rate database 16 if it had an SS7 link to an STP. Indeed, certain large business customers' PBXs already have SS7 links in place in order to communicate with SCPs to, for example, avail themselves of so-called intelligent call processing (ICP) services. In the present embodiment, however, PBX 40 is not provisioned with SS7 signaling capabilities. Rather, its access to the rate databases of the two IXC networks is via its ISDN connections thereto. Here, again, standard techniques can be used; it is already known how to provision PBXs with the capability of accessing network databases such as SCP 17 for ICP using ISDN signaling as described in further detail below.

The accessing of rate database 16 could be on a call-by-call basis. That is, whenever a subscriber at, for example, station set 35-1 connected to central office 31, or at station set 45-1 connected to PBX 40, enters the digits of a telephone number, the central office or PBX launches a query to the various IXC networks to obtain the current rate information for the call in question. Alternatively, a carrier's entire schedule of long-distance rates applicable to calls originating from the PBX or central office in question could be accessed periodically—for example, every quarter-hour—and stored locally in the PBX or central office, thereby obviating the need for a database query for every call.

Advantageously, the LECs and IXCs could establish a protocol whereby rate changes are made available within the rate database sufficiently in advance of when they are effective so as to allow the LEC to be sure that it is always in possession of the current rates. For example, it could be arranged that rate changes will be made available no later than 10, 25, 40 and 55 minutes past the hour, to be effective exactly five minutes later, i.e., on the quarter-hour. Another possibility is to avoid the need for the LECs or central offices to repeatedly access the IXCs' rate databases by having the IXCs automatically transmit their rate information to the central offices either periodically or whenever there is a change in the rates that apply to calls originating from that LEC or central office.

Alternatively, instead of each central office receiving the rate schedule information from the service providers directly, that information could be obtained by the LEC— either in response to a query or via automatic transmission from the service providers. The LEC, in turn, could either a) distribute the rate schedule to all of the central offices which the LEC controls or b) provide a LEC database to which each central office which the LEC controls could launch a query. The latter approach may be particularly advantageous in that the LEC database could precompare the rates offered by the various service providers and could determine and store information indicating which carrier offered the lowest rate to, for example, each possible destination central office in the overall network using, if desired, one or more of the statistical call models discussed above. A central office could then determine which provider a call is to be routed to by simply querying the central LEC database, supplying in the query the destination area code and local exchange code.

Moreover, if a particular service provider chose not to maintain a rate database, its fixed, published rates could nonetheless be stored locally and compared with the changing rates offered by providers who do.

Various of the possibilities mentioned above are illustrated in the flowcharts of FIGS. 2–5.

Figure 2:
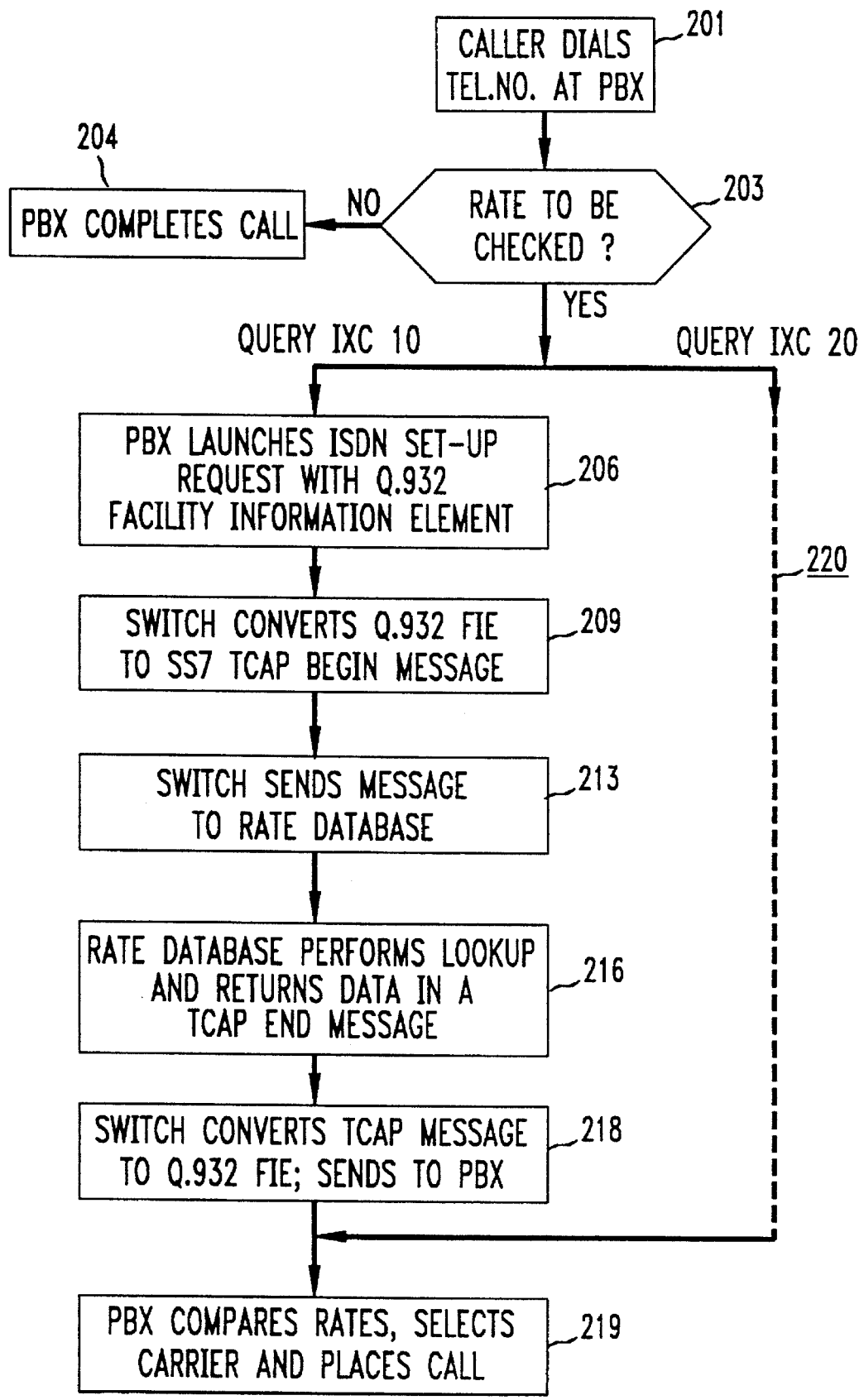
FIGS. 2–5 are flowcharts showing steps carried out within the network of FIG. 1 to implement various embodiments of the invention.

FIG. 2, in particular, is the PBX example described above. A caller at one of station sets 45-1 dials the telephone number of a called party (action block 201). PBX 40 thereupon determines whether this is a call for which the rate is to be checked. If it is not—as would be the case, for example, if the call were being made within the local calling area of the PBX—the call is completed normally (action block 204). If, however, the rate is to be checked, PBX 40 launches queries, in parallel, to IXCs 10 and 20.

With respect, in particular, to IXC 10, PBX 40 launches (action block 206) an ISDN set-up request with a Q.932 facility information element (FIE). This request contains within it the information needed to determine what the applicable rate for the call will be. Such information would include, for example, the calling and called telephone number area code and local exchange. The request is forwarded to toll switch 121 via D channels 49, CNI ring 122 and link 123. Switch 121 thereupon converts the Q.932 FIE into an SS7 TCAP BEGIN message (action block 209), and thereupon sends that message to rate database 16 using global title translation via link 123, CNI ring 122, SS7 link 127, STP 15 and SS7 link 161 (action block 213). Rate database 16 performs a lookup and, again using global title translation, returns the rate data to switch 121 in a TCAP END message (action block 216). (As is well known, toll call rates are typically defined by geographical distances between termination points and the aforementioned lookup may therefore include some simple computations to determine the rate.) Switch 121 converts the TCAP END message to a Q.932 FIE which it sends to PBX 40 (action block 218).

At the same time as action blocks 206 through 218 are being carried out within IXC 10, a similar set of action blocks—denoted generically at 220—is being carried out within IXC 20. Ultimately, PBX 40 has available to it the rates to be charged for the call in question by each of the two IXCs. It compares them, selects a carrier based on the comparison and then places the call to the selected carrier via the appropriate PRI link (action block 219).

Figure 3:
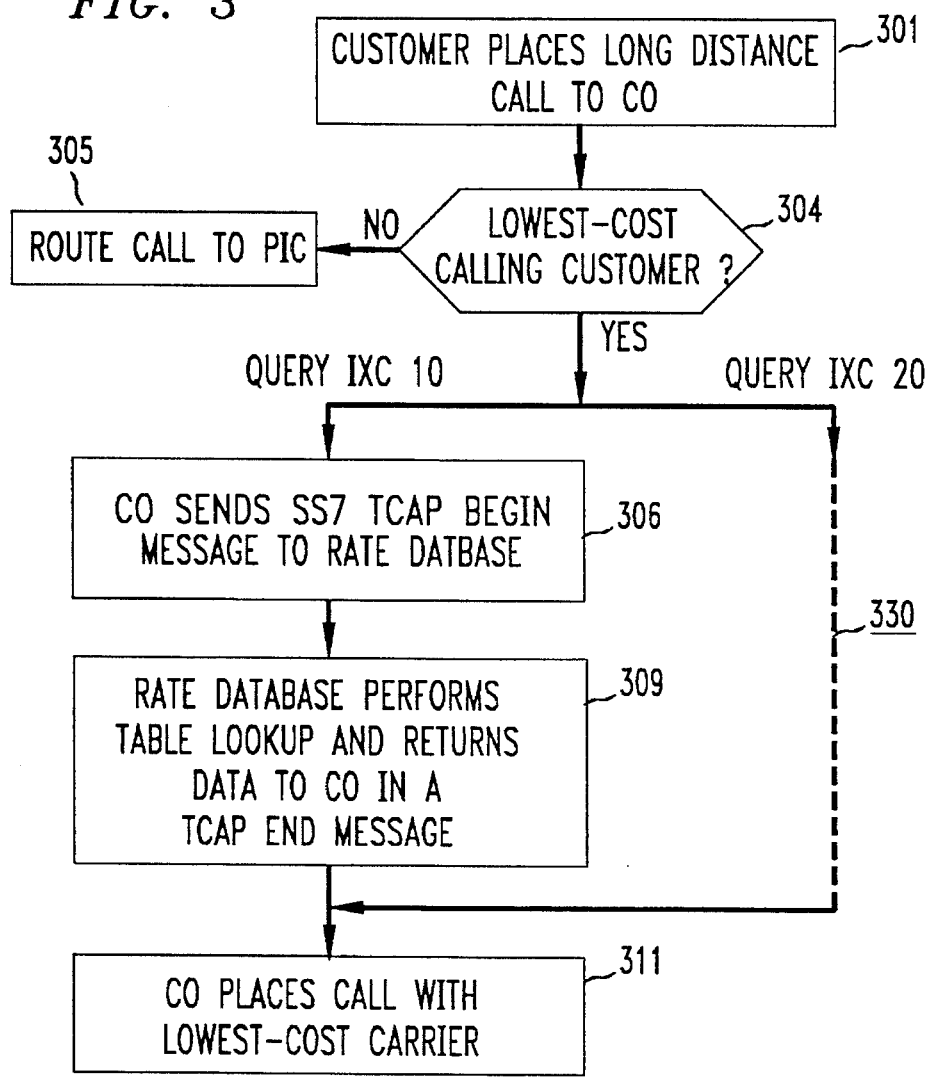

The steps of FIG. 3 illustrate the accessing of the rate database by LEC 30 to provide a "lowest-cost calling" service to subscribers who may wish to have this service. The subscriber (customer), such as a subscriber using station set 35-1, places a call to central office 31 (action block 301). The latter determines from an internal database (not shown) whether the subscriber in question has subscribed to the lowest-cost calling service (action block 304). If not, the call is routed to the subscriber's pre-selected primary interexchange carrier (action block 305). If yes, the central office launches queries, in parallel, to IXCs 10 and 20, as was the case for PBX 40 described above. Since central office 31 has direct SS7 links to the IXCs' rate databases, ISDN signaling is not involved in this case. Rather, the central office launches an appropriate SS7 TCAP BEGIN message to rate database 16 (in the case of IXC 10) via SS7 link 32, STP 35, SS7 link 34, STP 15, and SS7 link 161. The rate database performs the operations described earlier in conjunction with FIG. 2 and provides the desired data to central office 31 in a TCAP END message.

At the same time as action blocks 306 and 309 are being carried out within IXC 10, a similar set of action blocks—denoted generically at 330—is being carried out within IXC 20. Ultimately, central office 31 has available to it the rates to be charged for the call in question by each of the two IXCs. As before, it compares them, selects a carrier based on the comparison and then places the call to the selected carrier (action block 311).

As noted earlier, an alternative to making a rate database query for each call is to periodically—for example, every quarter-hour—access a carrier's entire schedule of long-distance rates and store them locally. This approach is illustrated in FIGS. 4 and 5, again in the context of a lowest-cost calling service offered by a LEC.

Figure 4:
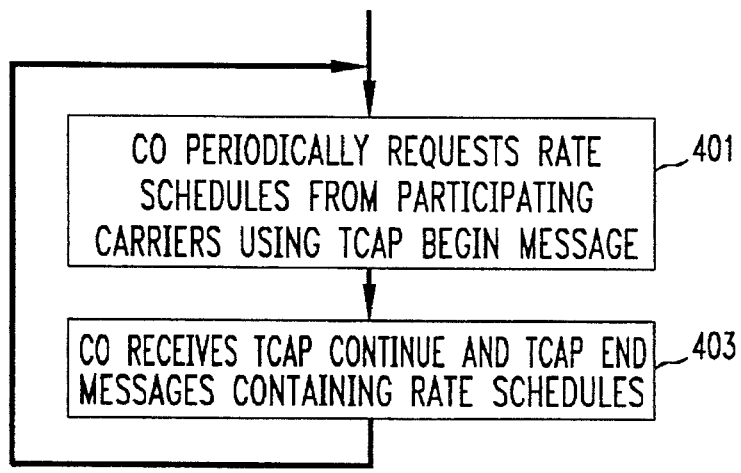

Action blocks 401 and 402 in FIG. 4 represent a process whereby central office 31 periodically receives from IXCs—via any of the mechanisms described above—the entire rate schedule applicable to calls routed from that central office via those IXCs. It initiates the process with a TCAP BEGIN message. Because the return information is fairly lengthy, it cannot be contained in a single TCAP END message. Rather, an IXC returns the rate schedule in a sequence of TCAP CONTINUE messages terminated by a TCAP END mesage.

Figure 5:
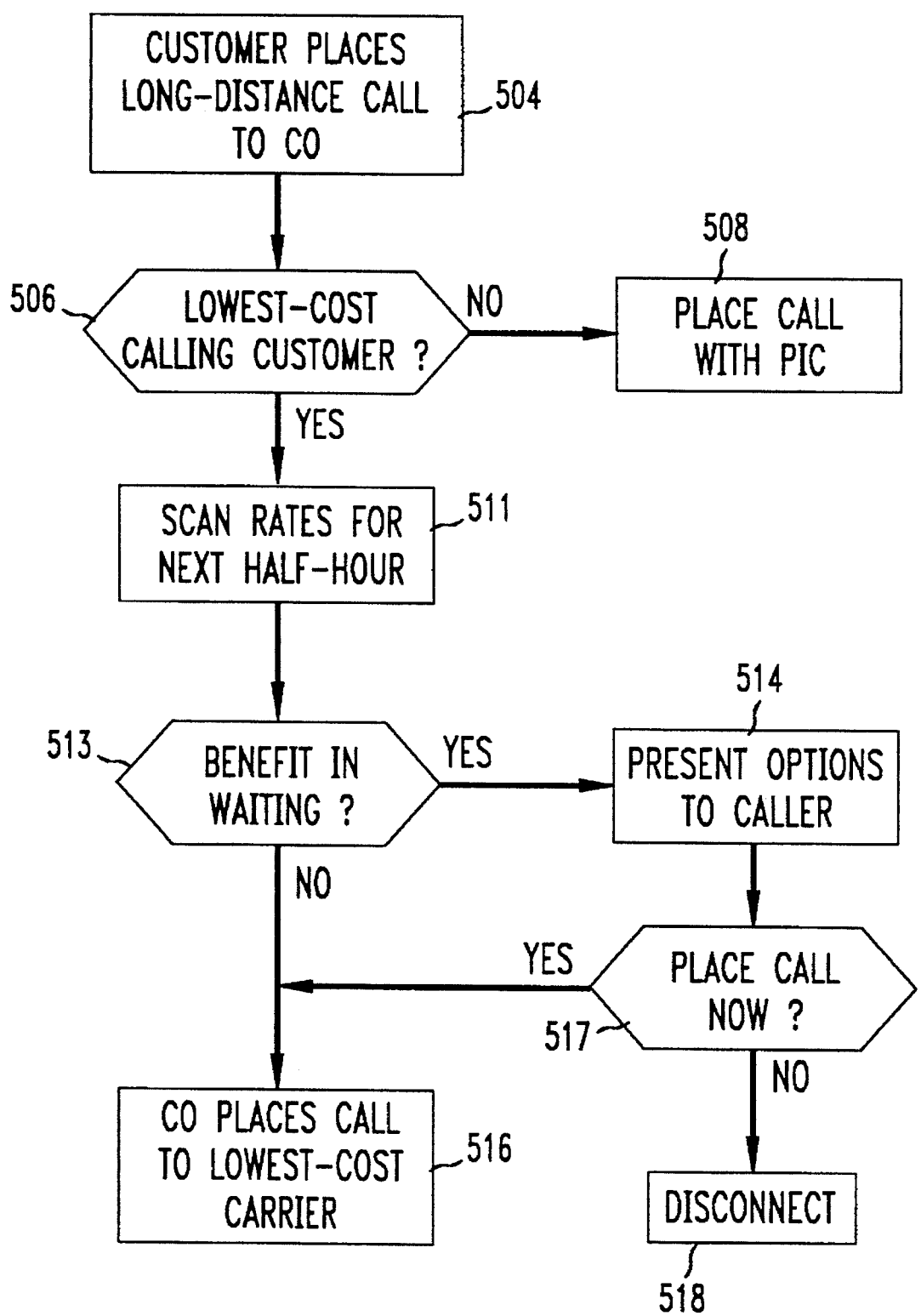

FIG. 5 shows the implementation of the lowest-cost calling service using this approach. In particular, action blocks 504, 506 and 508 are the same as action blocks 301, 304 and 305, respectively, of FIG. 3. At action block 511, however, a further service is offered to the subscriber. Specifically, it is postulated that an IXC may be willing to specify the rates that will be effective throughout some future time period, such as half an hour. Having retrieved those rates from the IXC's rate database, the central office can thereupon scan the rates that will be in effect throughout that future time period (action block 511). If there would be no benefit in waiting, because none of the IXCs will be offering a lower rate than the lowest rate currently available, then the call is routed to the lowest-cost carrier (action block 516). If there would be a benefit, then an announcement is presented to the caller (action block 514) informing him/her of the relevant facts, such as when the rate change will become effective and what the monetary benefit in waiting will be. The caller is prompted to indicate whether the call should be placed now or not (decision block 517). If yes, the call is placed (action block 516). If no, the call is disconnected (action block 518). In the event that the caller wishes to wait until a lower rate is available, the LEC can provide the further service of offering to automatically place the call when the new, lower rate becomes effective. Specifically, at the point in time that the new rate becomes effective, the central office would ring the originating telephone line. Upon the station set being taken off hook, it would proceed to connect it to the called party with, perhaps, an announcement being first provided to the originating station indicating that this was the call that had been re-scheduled pending the lower rate becoming effective.

We turn, now, to a discussion of how the rate schedules in rate database 16 are illustratively updated.

As noted earlier, IXC network 10 includes network monitor and control system 18. System 18 may comprise one or a plurality of so-called operations support systems. As is well known, such systems communicate with, for example, toll switch complexes, STPs, SCPs, transmission facilities and other network elements in order to monitor such factors as levels of traffic within various portions of the network and—based on the data thus obtained—to control, for example, the routing of traffic within the network and the issuing of alarms to network management personnel. System 18 communicates with the various network elements that it monitors and controls using BX.25 and OSI protocols. The communication is carried out by way of a switched digital network such as the Accunet® service network provided by AT&T and/or direct (point-to-point) connections. For example, direct connections may be used to interconnect system 18 with the toll switches, with the digital network connection being used as a backup. With the exception of rate database 16, the connections between system 18 and the other network elements are illustratively via the digital network only, with no backup. In FIG. 1, path 181 is representative of the links interconnecting system 18 with the switched digital network. Signaling paths 182 are representative of the aforementioned direct connections. As just alluded to, there does exist a direct connection between system 18 and rate database 16, that being via a specific one of paths 182—namely path 1821.

Network monitoring and control system 18 is programmed to report to rate database 16 certain predetermined rate-controlling data. In preferred embodiments, that data includes, at a minimum, the level of traffic at various points in the network as well as the status (active/inactive) of various particular network elements. The rate-controlling data is then used by rate database 16 to update the rate schedules.

In accordance with a feature of the invention, rate database 16 is illustratively an active database of the type described, for example, in Dayal et al, "The HiPAC Project: Combining Active Databases and Timing Constraints," *ACM-SIGMOD Record*, Vol. 17, No. 1, March 1988, pp. 51–70; McCarthy et al, "The Architecture of An Active Database Management System," *Proc. ACM-SIGMOD 1989 Int'l Conf. Management of Data*, Portland, Oreg., May–June 1989, pp. 215–224; Gehani et al, "Ode as an Active Database: Constraints and Triggers," *Proc. 17th Int'l Conf. Very Large Data Bases*, Barcelona, Spain 1991, pp. 327–336; Gehani et al, "Event Specification in an Active Object-Oriented Database," *Proc. ACM-SIGMOD 1992 Int'l Conf. on Management of Data*, San Diego, Calif. 1992; and Gehani et al," Composite Event Specification in Active Databases: Model & Implementation," *Proc. of the 18th Int'l Conf. on Very Large Databases*, Vancouver, BC, Canada, August 1992, all hereby incorporated by reference.

If a conventional database were used in this application, a software application executing independently of the database manager would have to be provided to a) repetitively access the rate-controlling data stored in the database, b) examine it and, c) based on a predetermined toll rate-changing algorithm, change the toll rates stored therein. The large volume of data that would typically be stored in the database, however, could well result in the need for an extremely powerful, and therefore expensive, processor on which to execute such an application. In an active database, by contrast, the database manager both a) stores data and b) generates an "alerter" or "trigger"—thereby initiating the taking of some action—when particular data meets particular pre-programmed criteria. (Indeed, a trigger can be used to decide whether particular rate-controlling data, such as the level of traffic through a switch at any particular time-is sufficiently "of interest" at this time to warrant storing it.) Because the data is being examined and acted upon as it is received, a much less powerful processor is required. In this case, that action is the updating of the toll rates.

As an example, rate database 16 can be programmed to reduce, by a predetermined percentage, the toll rate for all calls carded between a particular pair of toll switches if some criterion is met. Such rate reductions would be expected to have the effect of stimulating traffic along the route in question because, at least for some calls which include that route as one of their legs, the toll rate can be made less than that offered by other service providers. The programming within rate database 16 is such that at a later time, when some other criterion is met, the toll rate in question is returned to its original level. Indeed, it is possible that a rate may be increased above its typical level should conditions warrant it.

The criterion can be a very simple one, such as the crossing of a traffic level threshold (measured, for example, in calls-per-hour or percentage capacity) between the two switches. Or it can be quite complex, such as a criterion which takes into account traffic level trends involving quite a number of toll switches over some period of time. Other factors that could be used include the percentage of capacity to which a particular network element is loaded; the operational status (active/inactive) of various network elements; the extent to which a level of traffic differs from some predicted value, or combinations of these.

It will thus be appreciated that rate database 16 is really two databases. One stores rate controlling information used to generate the triggers. The other stores the rate schedules themselves.

Criteria other than those which relate to data provided from system 18 could also be used by rate database 16 to change the rates. For example, triggers generated by database 16 may take into account toll rates offered by IXC network 20, that data being obtained via an SS7 query made to a rate database within IXC network 20. As another possibility, triggers may be generated as a function of the level of demand at a particular element of the network for a network-based service, such as a network-based interactive game. Such data may be gotten, again via an SS7 query, from an SCP through which entry to the game is controlled.

Figure 6:
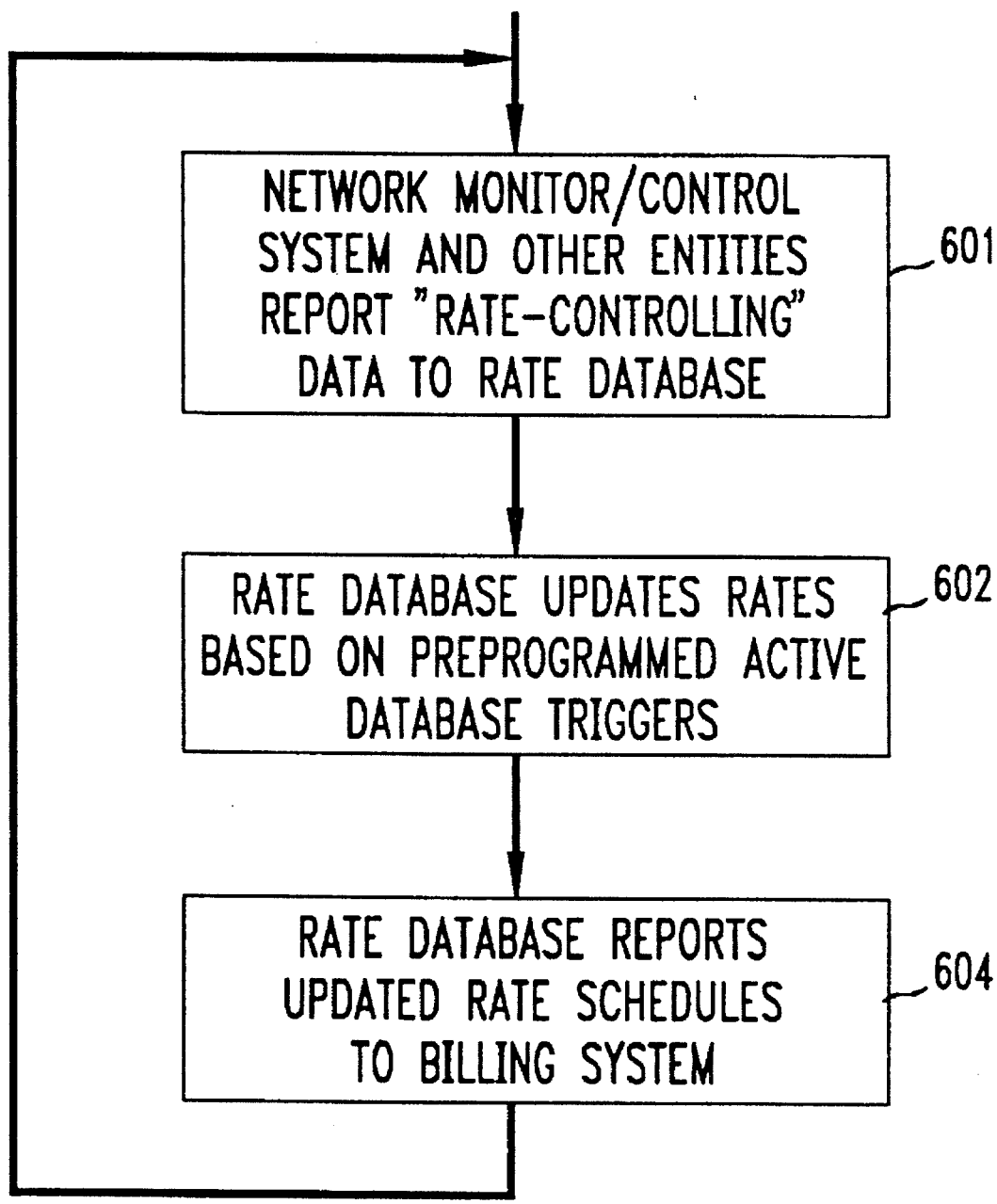
FIG. 6 is a flowchart showing steps carried out within the network of FIG. 1 to update toll rates stored in a rate database within the network.

An illustrative process by which the rates stored in rate database 16 are updated is shown in FIG. 6. As indicated at action block 601, system 18 and/or other sources of rate-controlling data provide that data to rate database 16. The latter, at action block 602, updates rates based on active database triggers generated in response to that data. The updated rates are thereupon communicated to the network's billing systems, as indicated at action block 604, illustratively in response to those same triggers.

Considering this last function in more detail, it will be appreciated that the changes in toll rates within rate database 16 must be coordinated with the operation of the billing systems (not shown) within the network. Typically, such billing systems receive billing records that are created by the toll switches at the completion of telephone calls. Ultimately each call is "rated" by the billing system, meaning simply that the toll charge for the call is computed based on the rates in effect when the call was made, and the computed charge is then added to the billing record for the call. Here, each toll rate change made in rate database 16 would have to be made known to those components of the overall billing infrastructure which rate the telephone calls. This is done straightforwardly by having rate database 16 communicate such changes into the billing system, via appropriate signaling links, and again, in response to those same triggers, sufficiently in advance of the time that they would become effective to be sure that the updated rate schedules would be available for the rating of calls made when those rates are effective. Each update would be accompanied with data indicating the time at which it is to become effective.

The foregoing merely illustrates the principles of the present invention. It will thus be appreciated that those skilled in the art will be able to devise numerous arrangements which, although not explicitly shown or described herein, embody those principles and are within their spirit and scope.

We claim:

1. A method, for use by a telecommunications carrier, which routes calls over a telecommunications network, said method comprising the steps of storing, in a database, rate information defining the toll rates currently in effect for at least one class of calls routed over said telecommunications network, and providing, to a source of said calls, via a telecommunications signaling path connected to said database, at least a portion of said rate information, said telecommunications signaling path including an SS7 signaling link, said source of said calls being telecommunications switching equipment which receives said calls from originating telephone station equipment and routes said calls to said telecommunications network, and said toll rates being the toll rates that apply to calls made from said telephone station equipment to respective called destinations.

2. The invention of claim 1 wherein said telecommunications signaling path includes a signal transfer point.

3. The invention of claim 1 wherein said database is an active database.

4. The invention of claim 1 wherein said portion of said rate information includes rate information applicable to calls which originate from said source of said calls.

5. The invention of claim 1 wherein, in said providing step, said portion of said rate information is provided in response to a query requesting rate information applicable to calls which originate from said source of said calls.

6. The invention of claim 1 comprising the further step of changing at least a portion of said stored rate information as a function of at least a first predetermined criterion.

7. A method for use by a telecommunications carrier which routes calls over a telecommunications network, said method comprising the steps of storing, in a database, rate information defining the toll rates currently in effect for at least one class of calls routed over said telecommunications network, changing at least a portion of said stored rate information as a function of at least a first predetermined criterion, and providing, to a source of said calls, via a telecommunications signaling path connected to said database, at least a portion of said rate information, said telecommunications signaling path including an SS7 signaling link, said portion of said rate information is provided in response to the occurrence of said changing.

8. The invention of claim 6 wherein said first predetermined criterion is a function of the operational status of at least one element of said telecommunications network.

9. A method, for use by a telecommunications carrier, which routes calls over a telecommunications network, said method comprising the steps of storing, in a database, rate information defining the toll rates currently in effect for at least one class of calls routed over said telecommunications network, and providing at least a portion of said rate information to a source of said calls via a telecommunications signaling path connected to said database in response to the changing of at least a portion of said stored rate information, said telecommunications signaling path including an SS7 signaling link, said source of said calls being telecommunications switching equipment which receives said calls from originating telephone station equipment and routes said calls to said telecommunications network, and said toll rates being the toll rates that apply to calls made from said telephone station equipment to respective called destinations.

10. A method, for use by a telecommunications carrier, which routes calls over a telecommunications network, said method comprising the steps of storing, in a database, rate information defining the toll rates currently in effect for at least one class of calls routed over said telecommunications network, changing at least a portion of said stored rate information as a function of the operational status of at least one element of said telecommunications network, and providing at least a portion of said rate information to a source of said calls via a telecommunications signaling path connected to said database, said telecommunications signaling path including an SS7 signaling link, said source of said calls being telecommunications switching equipment which receives said calls from originating telephone station equipment and routes said calls to said telecommunications network, and said toll rates being the toll rates that apply to calls made from said telephone station equipment to respective called destinations.

* * * * *